US011022776B2

(12) United States Patent
Kaneko

(10) Patent No.: US 11,022,776 B2
(45) Date of Patent: Jun. 1, 2021

(54) LENS BARREL

(71) Applicant: Nittoh Inc., Suwa (JP)

(72) Inventor: Kohei Kaneko, Suwa (JP)

(73) Assignee: Nittoh Inc.

( * ) Notice: Subject to any disclaimer, the term of this patent is extended or adjusted under 35 U.S.C. 154(b) by 193 days.

(21) Appl. No.: 16/326,315

(22) PCT Filed: Aug. 3, 2017

(86) PCT No.: PCT/JP2017/028218
§ 371 (c)(1),
(2) Date: Feb. 18, 2019

(87) PCT Pub. No.: WO2018/037872
PCT Pub. Date: Mar. 1, 2018

(65) Prior Publication Data
US 2019/0204533 A1    Jul. 4, 2019

(30) Foreign Application Priority Data
Aug. 24, 2016    (JP) ............................. JP2016-163583

(51) Int. Cl.
*G02B 7/10*    (2021.01)
*G02B 7/04*    (2021.01)
(Continued)

(52) U.S. Cl.
CPC ............... *G02B 7/10* (2013.01); *G02B 7/021* (2013.01); *G02B 7/023* (2013.01); *G02B 7/04* (2013.01); *G03B 3/10* (2013.01); *G03B 17/02* (2013.01); *H04N 5/225* (2013.01); *H04N 5/2254* (2013.01); *G03B 2205/00* (2013.01)

(58) Field of Classification Search
CPC . G02B 7/00; G02B 7/004; G02B 7/02; G02B 7/022; G02B 7/023; G02B 7/04
See application file for complete search history.

(56) References Cited

U.S. PATENT DOCUMENTS

| 2004/0060419 | A1* | 4/2004 | Goto | G10D 3/14 |
| | | | | 84/304 |
| 2010/0321804 | A1* | 12/2010 | Tsuchiya | G03B 3/02 |
| | | | | 359/823 |
| 2015/0205068 | A1 | 7/2015 | Sasaki | |

FOREIGN PATENT DOCUMENTS

| JP | H05-341369 A | 12/1993 |
| JP | 2009-192965 A | 8/2009 |

(Continued)

*Primary Examiner* — Robert E. Tallman
(74) *Attorney, Agent, or Firm* — Harness, Dickey & Pierce, P.L.C.

(57) ABSTRACT

A lens barrel includes: a lens frame that holds a lens and is movable in the optical axial direction of the lens; and a moving mechanism that moves the lens frame in the optical axial direction. The moving mechanism includes: a feed screw; a drive source that rotates the feed screw; a biasing member that biases the lens frame toward direction side; a nut on the direction side of the lens frame that is screwed with the feed screw; and a low-friction member between the nut and the lens frame in the optical axial direction. At least one of a friction coefficient between the lens frame and the low-friction member or a friction coefficient between the nut and the low-friction member is smaller than a friction coefficient between the lens frame and the nut when the lens frame is in contact with the nut.

16 Claims, 6 Drawing Sheets

(51) Int. Cl.
*H04N 5/225* (2006.01)
*G02B 7/02* (2021.01)
*G03B 3/10* (2021.01)
*G03B 17/02* (2021.01)

(56) References Cited

FOREIGN PATENT DOCUMENTS

JP    2014-092563 A    5/2014
JP    2015-138140 A    7/2015

\* cited by examiner

LENS BARREL

This application is a U.S. National Stage Application of International Application No. PCT/JP2017/028218, filed on Aug. 3, 2017, and published in Japanese as WO2018/037872 A1 on Mar. 1, 2018 and claims priority to Japanese Application No. 2016-163583, filed on Aug. 24, 2016. The entire disclosures of the above applications are incorporated herein by reference.

BACKGROUND

Technical Field

The present invention relates to lens barrels used for imaging devices.

Related Art

Conventional techniques include lens barrels used for imaging devices (e.g., see Japanese Patent Application Laid-open No. 2015-138140). The lens barrel described in JP 2015-138140 includes a focus lens, a lens frame that holds the focus lens, a guide shaft that guides the lens frame in the optical axis direction, a spring that biases the lens frame forward in the optical axis direction, a relay member with which the lens frame contacts from behind in the optical axis direction, and a relay guide shaft that guides the relay member in the optical axis direction. This lens barrel also includes a motor, and a nut that is screwed with a feed screw formed on a rotation shaft of the motor. The feed screw is inserted into a through hole formed in a nut-contact part of the relay member. The nut is disposed in front of the nut-contact part in the optical axis direction. The biasing force of the spring acts on the relay member via the lens frame, and the nut-contact part is in contact with the nut.

In the lens barrel described in JP 2015-138140, the lens frame is caused to follow the nut with the relay member by the biasing force of the spring and moves forward in the optical axis direction when the feed screw rotates in one direction and the nut moves forward in the optical axis direction. On the other hand, in this lens barrel, the lens frame is pushed by the nut via the relay member and moves backward in the optical axis direction when the feed screw rotates in the reverse direction and the nut moves backward in the optical axis direction.

The inventor's study has found that vibration (wobbling) of the lens frame occurs when the lens frame is moved in the optical axis direction using the feed screw and the nut as in the lens barrel described in JP 2015-138140. Specifically, it has been found that the influence of the gap between a female screw formed on the inner periphery of the nut and the feed screw results in vibration of the nut moving along the feed screw. It has been found that the vibration of the nut is transmitted to the lens frame and thereby the vibration of the lens frame also occurs. The inventor's study has found that image blurring occurs on an image when the lens frame moves, due to the vibration of the lens frame.

Thus, the problem of the present invention is to provide the lens barrel that reduces the vibration of the lens frame when the lens frame is moved using the feed screw and the nut.

SUMMARY

To solve the above problem, a lens barrel according to the present invention includes: a lens frame that holds a lens and is movable in an optical axis direction of the lens; and a moving mechanism that includes a feed screw and a drive source for rotating the feed screw and configured to move the lens frame in the optical axis direction. The lens frame has a through hole that goes through the lens frame in the optical axis direction. The feed screw is inserted into the through hole such that an axis direction of the feed screw is aligned with the optical axis direction. When one side of the optical axis direction is a first direction side and an opposite side of the first direction side is a second direction side, the moving mechanism includes a biasing member that biases the lens frame toward the first direction side, a nut that is disposed on the first direction side of the lens frame and is screwed with the feed screw, and a low-friction member that is disposed between the nut and the lens frame in the optical axis direction. At least either one of a friction coefficient between the lens frame and the low-friction member or a friction coefficient between the nut and the low-friction member is smaller than a friction coefficient between the lens frame and the nut when the lens frame is in contact with the nut.

In the lens barrel of the present invention, the low-friction member is disposed between the nut and the lens frame in the optical axis direction. At least either one of the friction coefficient between the lens frame and the low-friction member or the friction coefficient between the nut and the low-friction member is smaller than the friction coefficient between the lens frame and the nut when the lens frame is in contact with the nut. Thus, in the present invention, a frictional force produced between the low-friction member and the lens frame is smaller than a frictional force produced between the nut and the lens frame when the nut is in contact with the lens frame, as long as the friction coefficient between the lens frame and the low-friction member is smaller than the friction coefficient between the lens frame and the nut. A frictional force produced between the low-friction member and the nut is smaller than the frictional force produced between the nut and the lens frame when the nut is in contact with the lens frame, as long as the friction coefficient between the nut and the low-friction member is smaller than the friction coefficient between the lens frame and the nut.

That is to say, in the present invention, at least either one of the frictional force produced between the low-friction member and the lens frame or the frictional force produced between the low-friction member and the nut is smaller than the frictional force produced between the nut and the lens frame when the nut is in contact with the lens frame. Thus, in the present invention, the vibration of the nut in a direction perpendicular to the optical axis direction is less likely to be transmitted to the lens frame when the nut moves along the feed screw. As a result, the present invention reduces the vibration of the lens frame when the lens frame is moved using the feed screw and the nut.

In the present invention, it is preferable that the friction coefficient between the lens frame and the low-friction member and the friction coefficient between the nut and the low-friction member be smaller than the friction coefficient between the lens frame and the nut when the lens frame is in contact with the nut. In this configuration, both of the frictional force produced between the low-friction member and the lens frame and the frictional force produced between the low-friction member and the nut are smaller than the frictional force produced between the nut and the lens frame when the nut is in contact with the lens frame. Thus, the vibration of the nut in the direction perpendicular to the optical axis direction is less likely to be transmitted to the lens frame when the nut moves along the feed screw, so that the vibration of the lens frame is effectively reduced.

In the present invention, it is preferable that the low-friction member be a washer formed into a ring and flat shape, and the feed screw be inserted into the low-friction member through an inner peripheral side thereof. In this case, the low-friction member is formed into a circular ring shape, for example. This configuration, in which the feed screw is inserted into the low-friction member formed into a ring shape through the inner peripheral side of the low-friction member, prevents the low-friction member from displacing from a space between the nut and the lens frame.

In the present invention, it is preferable that an inner periphery of the low-friction member be within an outer shape of the nut when viewed from the optical axis direction. This configuration ensures that the low-friction member is disposed between the nut and the lens frame in the entire circumference of the low-friction member formed into the ring shape. This surely prevents the nut from contacting with the lens frame.

In the present invention, it is preferable that the low-friction member be within the outer shape of the nut when viewed from the optical axis direction. This configuration helps to prevent the low-friction member from interfering with another structure.

In the present invention, it is preferable that a thickness of the low-friction member be equal to or larger than a pitch of the feed screw. This configuration prevents the vibration of the low-friction member due to the motion of the low-friction member, when the feed screw rotates, in the radial direction of the feed screw along a thread and a screw groove of the feed screw. This reduces the vibration of the lens frame due to the vibration of the low-friction member.

In the present invention, for example, a specific gravity of the low-friction member is larger than at least either one of a specific gravity of the lens frame or a specific gravity of the nut. This case yields the increased inertia of the moving low-friction member and thus reduces the vibration of the moving low-friction member. This reduces the vibration of the lens frame due to the vibration of the low-friction member.

In the present invention, it is preferable that the low-friction member be formed of polytetrafluoroethylene. With this configuration, the frictional force produced between the low-friction member and the lens frame and the frictional force produced between the low-friction member and the nut can be further decreased. Thus, the vibration of the nut in the direction perpendicular to the optical axis direction is less likely to be transmitted to the lens frame when the nut moves along the feed screw, so that the vibration of the lens frame is effectively reduced.

Advantageous Effects of Invention

As above, the lens barrel according to the present invention reduces the vibration of the lens frame when the lens frame is moved using the feed screw and the nut.

DETAILED DESCRIPTION

Embodiments of the present invention are described below with reference to the drawings.

Lens Barrel Configuration

Figure 1:
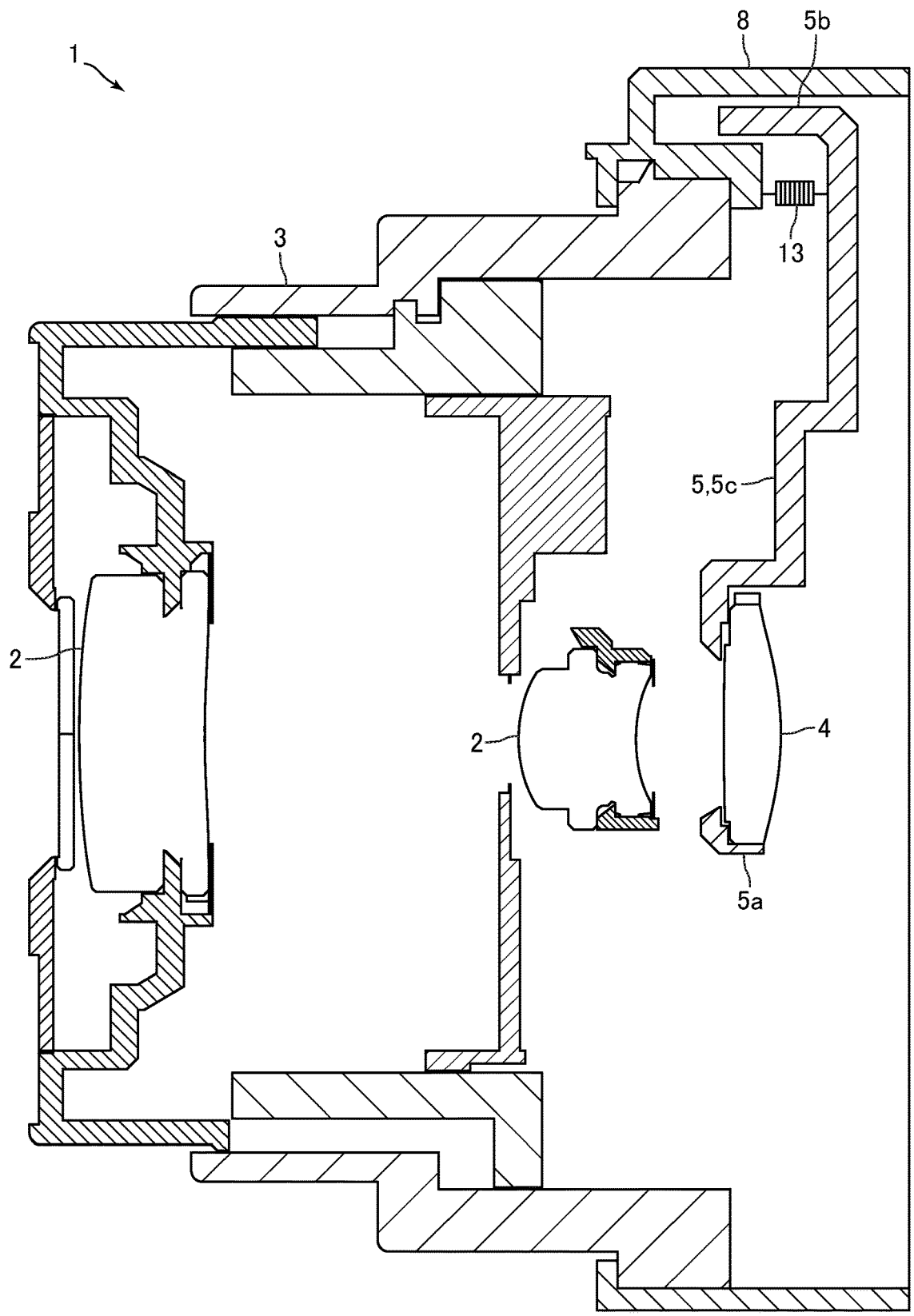
FIG. 1 is a schematic sectional view of a lens barrel according to an embodiment of the present invention.
Figure 2:
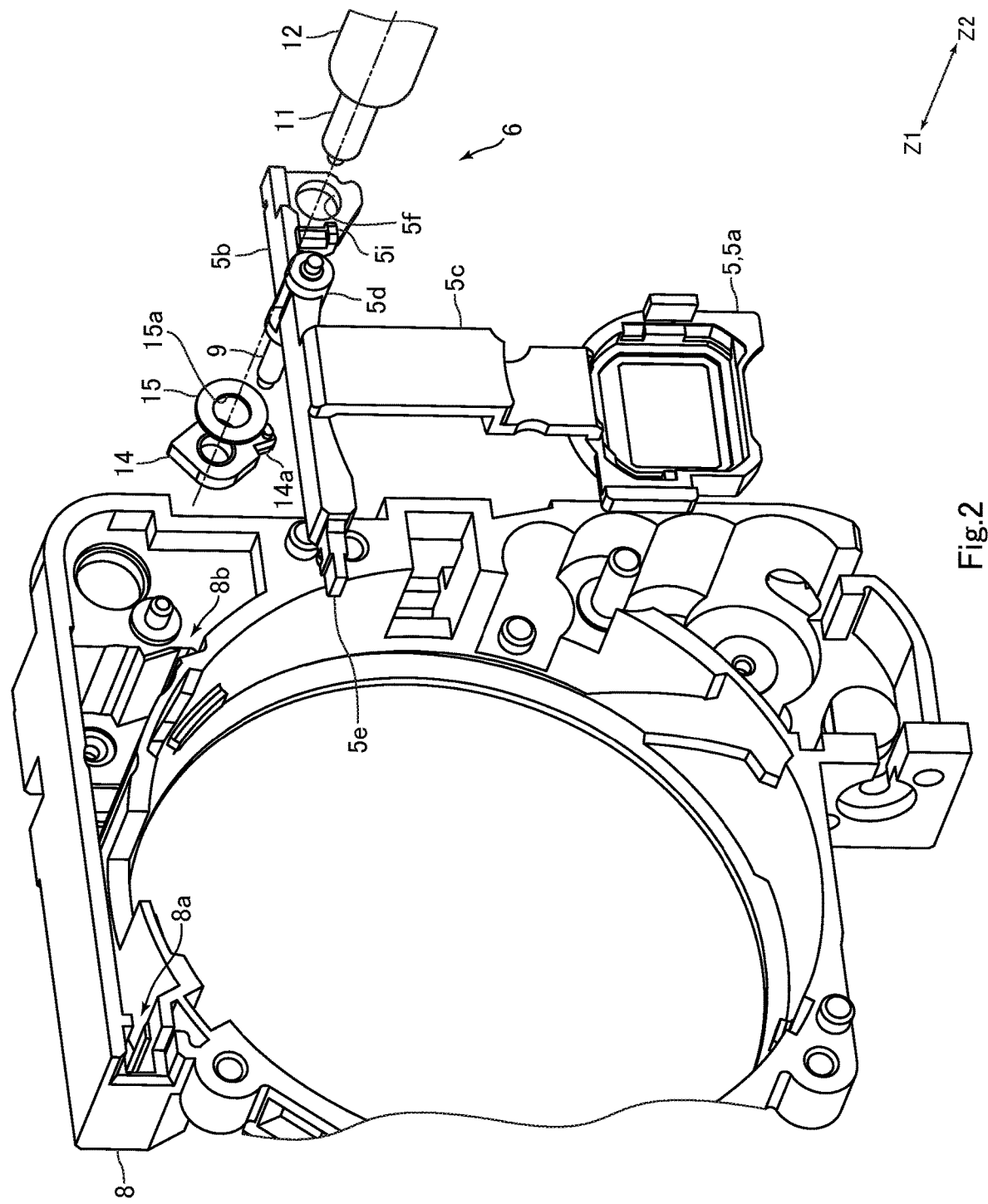
FIG. 2 is an exploded perspective view of a lens frame, a holding member and a moving mechanism shown in FIG. 1.
Figure 3:
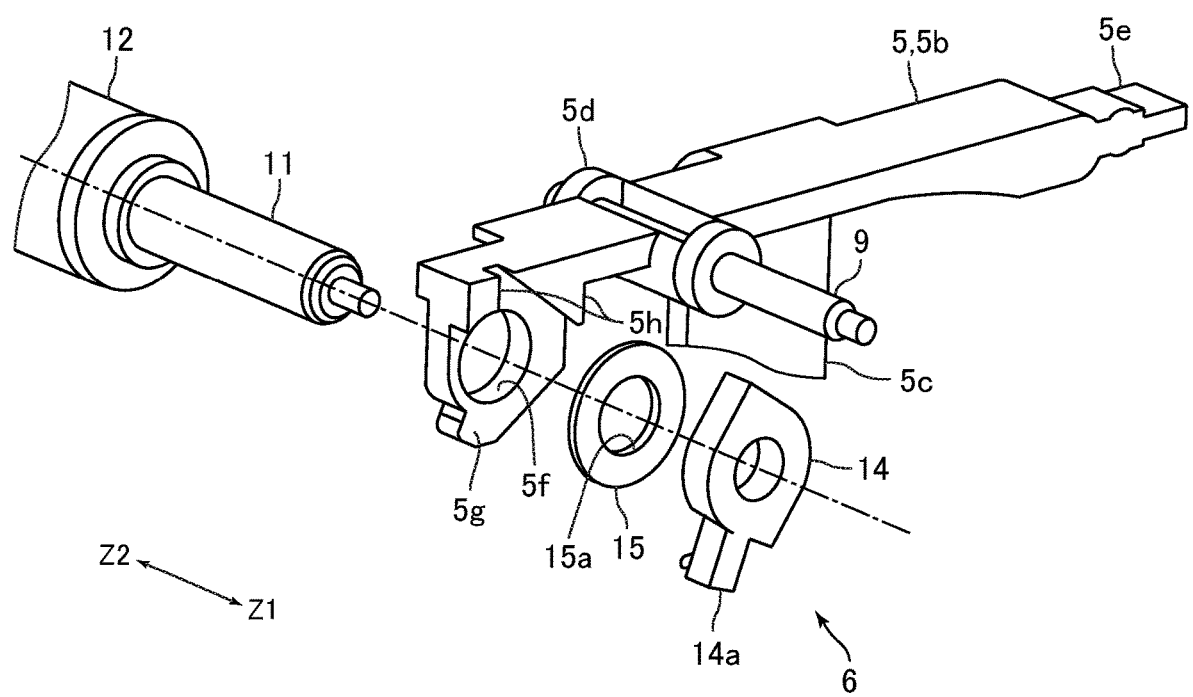
FIG. 3 is an exploded perspective view of part of the lens frame and the moving mechanism shown in FIG. 2, viewed from a different direction.
Figure 4:
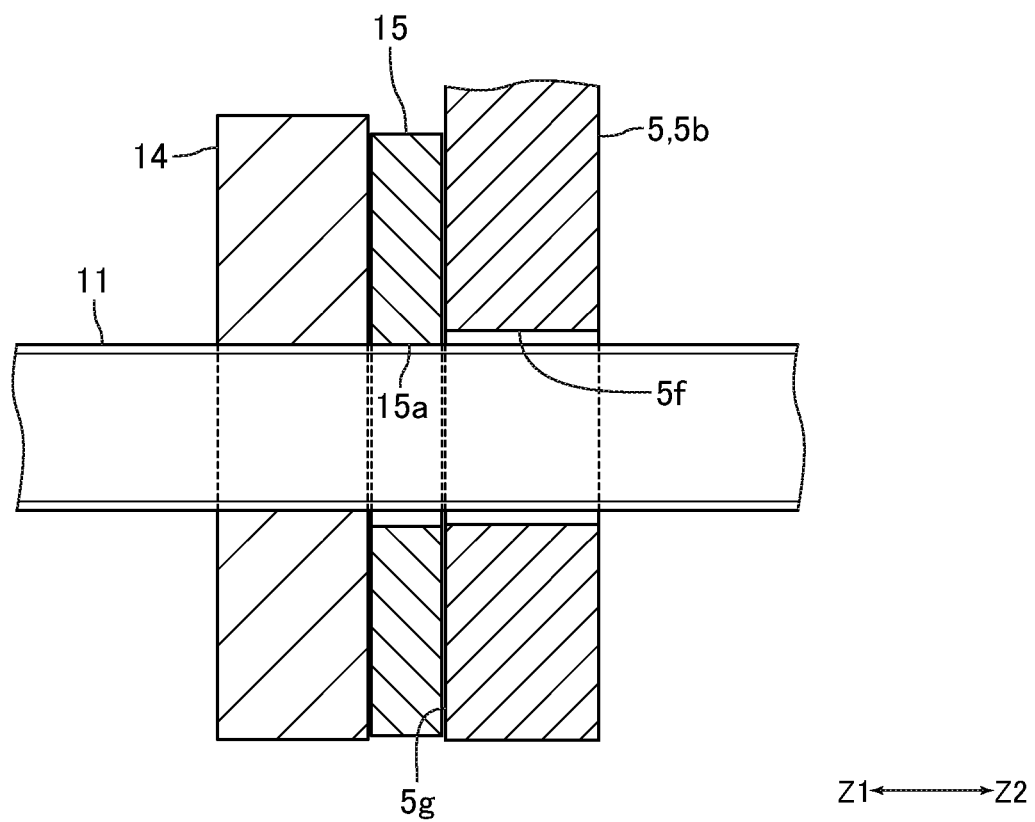
FIG. 4 is a sectional view of a feed screw inserted through the lens frame, a nut and a washer shown in FIG. 3.

FIG. 1 is a schematic sectional view of a lens barrel 1 according to an embodiment of the present invention. FIG. 2 is an exploded perspective view of a lens frame 5, a holding member 8 and a moving mechanism 6 shown in FIG. 1. FIG. 3 is an exploded perspective view of part of the lens frame 5 and the moving mechanism 6 shown in FIG. 2, viewed from a different direction. FIG. 4 is a sectional view of a feed screw 11 inserted through the lens frame 5, a nut 14 and a washer 15 shown in FIG. 3.

The lens barrel 1 in the present embodiment is used for imaging devices (not shown), such as digital cameras. This lens barrel 1 includes a lens 2 and a lens holder 3 that holds the lens 2. The lens barrel 1 also includes a focus lens 4 (hereinafter, referred to as a "lens 4"). The lens 4 is disposed such that the optical axis of the lens 4 is aligned with the optical axis of the lens 2. The lens barrel 1 also includes a lens frame 5 and a moving mechanism 6 (focus adjustment mechanism). The lens frame 5 is movable in the direction of the optical axes of the lenses 2 and 4 (optical axis direction) while holding the lens 4, and the moving mechanism 6 moves the lens frame 5 in the optical axis direction.

In the following description, one side of the optical axis direction (the Z1 direction side in FIG. 1 and other figures) is assumed a "front" side, and the opposite side (the Z2 direction side in FIG. 1 and other figures) is assumed a "back" (rear) side. In the present embodiment, the front side is an object side, and the rear side is an image side. The front side in the present embodiment is a first direction side and the rear side is a second direction side. The first direction side is one side of the optical axis direction, and the second direction side is the opposite side of the first direction side.

The lens holder 3 includes a holding member 8 that holds the lens frame 5 movably. The holding member 8 is formed into a cylinder shape and constitutes the back end side of the lens holder 3. The lens frame 5 is disposed on the inner peripheral side of the holding member 8. The lens 4 is disposed behind the lens 2. In the case where the imaging device that uses the lens barrel 1 is a digital camera, an imaging element is disposed the behind the lens 4. A guide shaft 9 for guiding the lens frame 5 in the optical axis direction (front-back direction) is fixed to the holding member 8. The holding member 8 has a guide groove 8a (see FIG. 2) for guiding the lens frame 5 in the optical axis direction, and a guide groove 8b for preventing rotation of the nut 14 described below constituting the moving mechanism 6.

The lens frame 5 is formed of a resin material. Specifically, the lens frame 5 is formed of polycarbonate (PC). This lens frame 5 includes a lens-holding part 5a, a held part 5b and a coupling part 5c. The lens 4 is fixed to the lens-holding part 5a, the held part 5b is held by the holding member 8, and the coupling part 5c couples the lens holding part 5a to the held part 5b. The coupling part 5c is formed so as to extend from the lens-holding part 5a toward outside of the radial direction of the lens 4. The held part 5b has a cylindrical guide part 5d into which the guide shaft 9 is inserted, and a guide part 5e that engages the guide groove 8a. The held part 5b also has a through hole 5f. The feed screw 11 described below constituting the moving mechanism 6 is inserted into the through hole 5f. The through hole 5f goes through the held part 5b in the front-back direction.

The moving mechanism 6 includes: the feed screw (lead screw) 11; a motor 12 as a drive source configured to rotate the feed screw 11; a spring 13 (see FIG. 1) as a biasing member that biases the lens frame 5 forward; the nut 14 screwed with the feed screw 11 and disposed in front of the lens frame 5; and the washer 15 as a low-friction member that is disposed between the nut 14 and the lens frame 5 in the front-back direction. Note that FIG. 1 illustrates only the spring 13 of the components of the moving mechanism 6. In FIG. 2 and FIG. 3, the illustration of the spring 13 is omitted.

The feed screw 11 is disposed such that the axis direction of the feed screw 11 is aligned with the front-back direction. That is to say, the axis direction of the feed screw 11 is disposed parallel to the optical axis. The feed screw 11 is inserted into the through hole 5f. The motor 12 is attached to the holding member 8 via an attaching member (not shown). The feed screw 11 is fixed to the output shaft of the motor 12. For example, the spring 13 is a pulling coil spring. One end (the front end) of the spring 13 is attached to the holding member 8, and the other end (the back end) of the spring 13 is attached to the lens frame 5. The holding member 8 has a spring-locking hook that hooks one end of the spring 13, and the lens frame 5 has a spring-locking hook 5i (see FIG. 2) that hooks the other end of the spring 13. The spring-locking hook formed on the holding member 8 is covered by the sidewall of the holding member 8 and is therefore not shown. The feed screw 11 may be formed on the output shaft of the motor 12. The spring 13 may be, for example, a compression coil spring, a torsion coil spring or a leaf spring.

The nut 14 is formed of a resin material. Specifically, the nut 14 is formed of polycarbonate. The nut 14 is formed into a ring shape, and a female screw is formed on the inner periphery of the nut 14. The nut 14 also has a projection 14a that projects to its outer peripheral side. The projection 14a engages the guide groove 8b of the holding member 8. The projection 14a and the guide groove 8b prevent the rotation of the nut 14 about the feed screw 11.

The washer 15 is formed into a ring and flat shape. The washer 15 in the present embodiment is formed into a circular ring shape. The inner diameter of the washer 15 (the inner diameter of the hole 15a) is slightly larger than the outer diameter of the feed screw 11. The feed screw 11 is inserted into the washer 15 through the inner peripheral side thereof. As described above, the washer 15 is disposed between the nut 14 and the lens frame 5 in the front-back direction, and the lens frame 5 is biased forward by the spring 13. Thus, the front surface of the washer 15 is in contact with the back surface of the nut 14. The back surface of the washer 15 is in contact with the front surface of the lens frame 5. Specifically, the periphery of the through hole 5f in the front surface of the held part 5b has a contact surface 5g having a plane shape perpendicular to the front-back direction, and the back surface of the washer 15 is in contact with the contact surface 5g. The upper side of the contact surface 5g in FIG. 3 has a thick part 5h for reinforcement. The thick part 5h is formed so as to project forward relative to the contact surface 5g. The thick part 5h is formed over the entire part of the held part 5b except the part on which the contact surface 5g is formed.

The washer 15 is formed of a resin material. Specifically, the washer 15 is formed of polytetrafluoroethylene (PTFE).

As described above, the lens frame 5 and the nut 14 are formed of polycarbonate. Thus, the friction coefficient between the lens frame 5 and the washer 15 and the friction coefficient between the nut 14 and the washer 15 are smaller than the friction coefficient between the lens frame 5 and the nut 14 when (in the case) the lens frame 5 is in contact with the nut 14. The specific gravity of the washer 15 is larger than the specific gravity of the lens frame 5 and the specific gravity of the nut 14.

The inner diameter of the washer 15 is slightly larger than the outer diameter of the feed screw 11 as described above, and the inner periphery surface of the washer 15 is within the outer shape of the nut 14 when viewed from the front-back direction. That is to say, the outer diameter of the feed screw 11, the outer diameter of the nut 14, and the inner diameter of the washer 15 are set such that the inner periphery of the washer 15 is within the outer shape of the nut 14 when viewed from the front-back direction. In the present embodiment, the washer 15 is within the outer shape of the nut 14 when viewed from the front-back direction. That is to say, the outer diameter of the feed screw 11, the outer diameter of the nut 14, the inner diameter of the washer 15, and the outer diameter of the washer 15 are set such that the washer 15 is within the outer shape of the nut 14 when viewed from the front-back direction.

The thickness (the thickness in the front-back direction) of the washer 15 is equal to or larger than the pitch of the feed screw 11 (the distance between threads next to each other). In the present embodiment, the thickness of the washer 15 is equal to the pitch of the feed screw 11. For example, the thickness of the washer 15 and the pitch of the feed screw 11 are 0.2 (mm).

In the lens barrel 1, the lens frame 5 is caused to follow the nut 14 by the biasing force of the spring 13 and moves forward when the feed screw 11 rotates in one direction and the nut 14 moves forward. The lens frame 5 is pushed by the nut 14 via the washer 15 and moves backward when the feed screw 11 rotates in the reverse direction and the nut 14 moves backward.

Main Effects of the Present Embodiment

As described above, the lens barrel 1 in the present embodiment includes the lens frame 5 and the moving mechanism 6. The lens frame 5 is movable in the front-back direction (the optical axis direction of the lens 4) while holding the lens 4, and the moving mechanism 6 has the feed screw 11 and the motor 12 configured to rotate the feed screw 11 and moves the lens frame 5 in the front-back direction. The lens frame 5 has the through hole 5f that goes through the lens frame 5 in the front-back direction (optical axis direction), and the feed screw 11 is inserted into the through hole 5f such that the axis direction of the feed screw 11 and the optical axis direction are parallel. Furthermore, the moving mechanism 6 includes the spring 13, the nut 14 and the washer 15. The spring 13 biases the lens frame 5 forward, the nut 14 is disposed in front of the lens frame 5 and is screwed with the feed screw 11, and the washer 15 is disposed between the nut 14 and the lens frame 5 in the front-back direction. The friction coefficient between the lens frame 5 and the washer 15 and the friction coefficient between the nut 14 and the washer 15 are smaller than the friction coefficient between the lens frame 5 and the nut 14 when the lens frame 5 is in contact with the nut 14. Furthermore, the lens frame 5 is caused to follow the nut 14 by the biasing force of the spring 13 and moves forward when the feed screw 11 rotates and the nut 14 moves forward, and is pushed by the nut 14 and moves backward when the feed screw 11 rotates and the nut 14 moves backward.

In the present embodiment, the friction coefficient between the lens frame 5 and the washer 15 and the friction coefficient between the nut 14 and the washer 15 are smaller than the friction coefficient between the lens frame 5 and the nut 14 when the lens frame 5 is in contact with the nut 14, so that the frictional force produced between the washer 15 and the lens frame 5 and the frictional force produced between the washer 15 and the nut 14 are smaller than the frictional force produced between the nut 14 and the lens frame 5 when the nut 14 is in contact with the lens frame 5. Thus, in the present embodiment, the vibration of the nut 14 in the direction perpendicular to the front-back direction is less likely to be transmitted to the lens frame 5 when the nut 14 moves along the feed screw 11. As a result, in the present embodiment, the vibration of the lens frame 5 is reduced when the lens frame 5 is moved using the feed screw 11 and the nut 14.

In particular, the washer 15 is formed of polytetrafluoroethylene in the present embodiment, so that the frictional force produced between the washer 15 and the lens frame 5 and the frictional force produced between the washer 15 and the nut 14 are further decreased. Thus, in the present embodiment, the vibration of the nut 14 in the direction perpendicular to the front-back direction is less likely to be transmitted to the lens frame 5 when the nut 14 moves along the feed screw 11, so that the vibration of the lens frame 5 is effectively reduced.

As in the present embodiment, it is preferable that the inner periphery of the washer 15 be within the outer shape of the nut 14 when viewed from the front-back direction. That is to say, as in the present embodiment, it is preferable that the washer 15 be disposed between the nut 14 and the lens frame 5 in the entire circumference of the inner periphery of the washer 15 formed into the circular ring shape. This case surely prevents the nut 14 from contacting with the lens frame 5. In this case, the front surface of the washer 15 is in contact with the nut 14 in the entire circumference around the hole 15*a*. The back surface of the washer 15 is in contact with the lens frame 5 in the entire circumference around the hole 15*a*. This prevents the washer 15 from inclining back and forth. If the inner periphery of the washer 15 fails to be within the outer shape of the nut 14 when viewed from the front-back direction, the washer 15 inclines back and forth and the washer 15 is pushed against one side between the nut 14 and the lens frame 5, so that the washer 15 may be broken.

As in the embodiment, it is preferable that the thickness of the washer 15 be equal to or larger than the pitch of the feed screw 11. This case prevents the vibration of the washer 15 due to the washer 15 moving, when the feed screw 11 rotates, in the radial direction of the feed screw 11 along a thread and a screw groove of the feed screw 11. This reduces the vibration of the lens frame 5 due to the vibration of the washer 15. In the case where the thickness of the washer 15 is smaller than the pitch of the feed screw 11, the washer 15 may drop into a screw groove of the feed screw 11. When the washer 15 drops into a screw groove of the feed screw 11, the washer 15 inclines in the tilt direction of the screw groove. The washer 15 is thus pushed against one side between the nut 14 and the lens frame 5, so that the washer 15 may be broken.

As in the present embodiment, it is preferable that the specific gravity of the washer 15 be larger than the specific gravity of the lens frame 5 and the specific gravity of the nut 14. This case yields the increased inertia of the moving washer 15. This reduces the vibration of the moving washer 15, thereby reducing the vibration of the lens frame 5 due to the vibration of the washer 15.

As in the present embodiment, it is preferable that the washer 15 be formed into the ring and flat shape and the feed screw 11 be inserted into the washer 15 through the inner peripheral side thereof. In this case, the washer 15 can be prevented from displacing from a space between the nut 14 and the lens frame 5. As in the present embodiment, it is preferable that the washer 15 be within the outer shape of the nut 14 when viewed from the front-back direction. This case helps to prevent the washer 15 from interfering with the thick part 5*h* of the lens frame 5.

As in the present embodiment, it is preferable that the contact surface 5*g* of the held part 5*b* be disposed behind the front surface of the thick part 5*h*. It is preferable that the thick part 5*h* and the nut 14 be formed into a shape involving no interference between them with the washer 15 sandwiched between the contact surface 5*g* and the nut 14. In other words, it is preferable that the back surface of the nut 14 with the washer 15 sandwiched between this nut 14 and the contact surface 5*g* be located behind the front surface of the thick part 5*h*. That is to say, it is preferable that the thick part 5*h* and the nut 14 have a part overlapping with each other in the direction perpendicular to the optical axis. This case yields the thinned thickness from the back surface of the held part 5*b* to the front surface of the nut 14, thereby ensuring the scaling-down of the moving mechanism 6. If the washer 15 fails to be within the outer shape of the nut 14 when viewed from the front-back direction, the back surface of the washer 15 may contact (interfere) with the front surface of thick part 5*h*. In other words, this may hinder the thickness from the back surface of the held part 5*b* to the front surface of the nut 14 from being thinned. In contrast, the configuration in which the washer 15 is within the outer shape of the nut 14 when viewed from the front-back direction, as described above, surely prevents the thick part 5*h* of the lens frame 5 from interfering with the washer 15 and ensures the scaling-down of the moving mechanism 6.

Another Embodiment

Although the washer 15 is formed of polytetrafluoroethylene in the above embodiment, the washer 15 may be formed of a material other than polytetrafluoroethylene, as long as the friction coefficient between the lens frame 5 and the washer 15 and the friction coefficient between the nut 14 and the washer 15 are smaller than the friction coefficient between the lens frame 5 and the nut 14 when the lens frame 5 is in contact with the nut 14. For example, the washer 15 may be formed of polyslider. Although the lens frame 5 and the nut 14 are formed of polycarbonate in the above embodiment, the lens frame 5 and the nut 14 may be formed of different materials.

Although, in the above embodiment, the friction coefficient between the lens frame 5 and the washer 15 and the friction coefficient between the nut 14 and the washer 15 are smaller than the friction coefficient between the lens frame 5 and the nut 14 when the nut 14 is in contact with the lens frame 5, the friction coefficient between the lens frame 5 and the washer 15 or the friction coefficient between the nut 14 and the washer 15 may be equal to or larger than the friction coefficient between the lens frame 5 and the nut 14 when the nut 14 is in contact with the lens frame 5. For example, in the case where the front side of the washer 15 and the back side of the washer 15 are formed of different materials, the friction coefficient between the lens frame 5 and the washer 15 or the friction coefficient between the nut 14 and the washer 15 may be equal to or larger than the friction coefficient between the lens frame 5 and the nut 14 when the nut 14 is in contact with the lens frame 5.

In this case, either one of the friction coefficient between the lens frame 5 and the washer 15 or the friction coefficient between the nut 14 and the washer 15 is smaller than the friction coefficient between the lens frame 5 and the nut 14 when the nut 14 is in contact with the lens frame 5, so that the frictional force produced between the washer 15 and the lens frame 5 or the frictional force produced between the washer 15 and the nut 14 is smaller than the frictional force produced between the nut 14 and the lens frame 5 when the nut 14 is in contact with the lens frame 5. Thus, the vibration of the nut 14 in the direction perpendicular to the front-back direction is less likely to be transmitted to the lens frame 5 when the nut 14 moves along the feed screw 11.

Figure 5A:
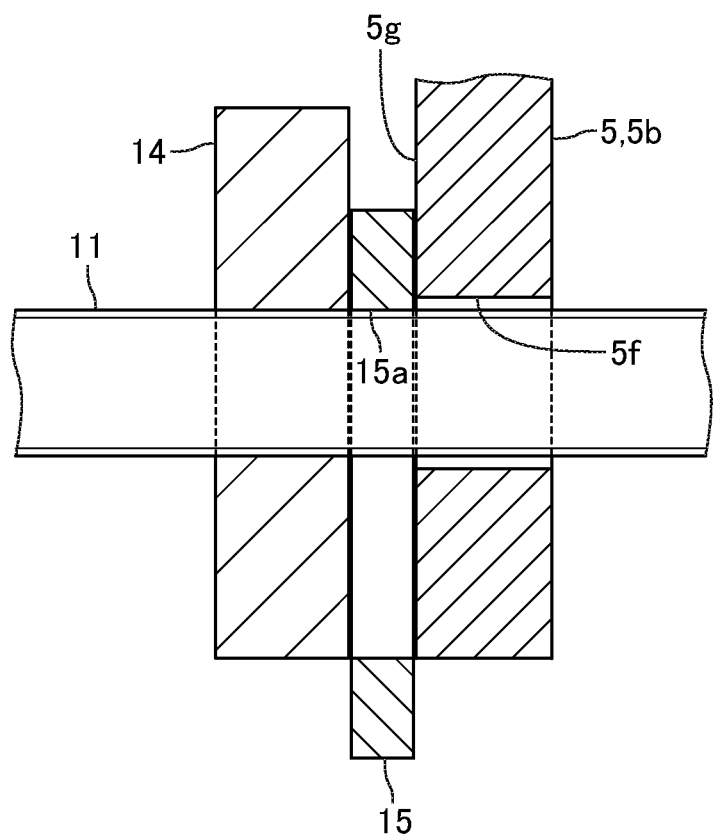
FIGS. 5A and 5B are views illustrating a washer configuration according to another embodiment of the present invention.
Figure 5B:
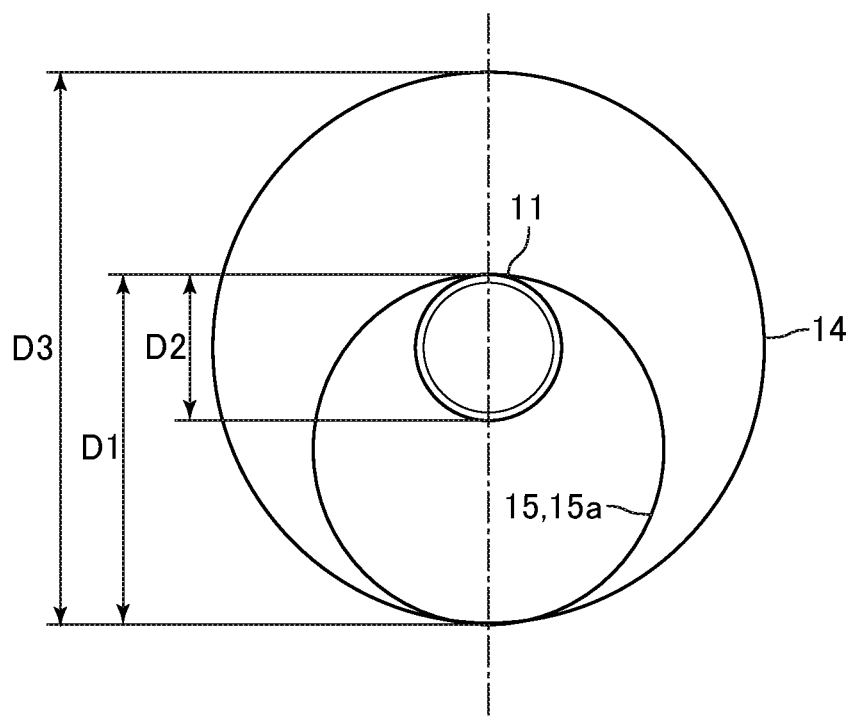

Although the inner diameter of the washer 15 is slightly larger than the outer diameter of the feed screw 11 in the above embodiment, the inner diameter of the washer 15 may be significantly larger than the outer diameter of the feed screw 11, as shown in FIG. 5A. In this case, the following inequality is preferable:

$$D1 < D2/2 + D3/2$$

where D1 is the inner diameter of the washer 15, D2 is the outer diameter of the feed screw 11, and D3 is the outer diameter of the nut 14, as shown in FIG. 5B. In this case, the inner periphery of the washer 15 is within the outer shape of the nut 14 when viewed from the front-back direction. As in the above embodiment, this surely prevents the nut 14 from contacting with the lens frame 5.

Although the washer 15 is formed into the circular shape in the above embodiment, the washer 15 may be formed into an elliptical ring shape, or may be formed into a polygonal ring shape, such as a rectangular ring shape. Although the washer 15 is formed into the ring shape in the above embodiment, the washer 15 may be formed into a shape other than the ring shape, as long as the washer 15 does not displace from a space between the nut 14 and the lens frame 5. For example, the washer 15 may be formed of a U-shape or a C-shape.

The invention claimed is:

1. A lens barrel, comprising:
a lens frame that holds a lens and is movable in an optical axis direction of the lens; and
a moving mechanism that includes a feed screw and a drive source for rotating the feed screw and is configured to move the lens frame in the optical axis direction, wherein
the lens frame has a through hole that goes through the lens frame in the optical axis direction,
the feed screw is inserted into the through hole such that an axis direction of the feed screw is aligned with the optical axial direction,
when one side of the optical axial direction is a first direction side and an opposite side of the first direction side is a second direction side, the moving mechanism includes a biasing member that biases the lens frame toward the first direction side, a nut that is disposed on the first direction side of the lens frame and is screwed with the feed screw, and a low-friction member that is disposed between the nut and the lens frame in the optical axial direction, the low-friction member being formed separately from the nut and the lens frame, and
at least either one of a friction coefficient between the lens frame and the low-friction member or a friction coefficient between the nut and the low-friction member is smaller than a friction coefficient between the lens frame and the nut when the lens frame is in contact with the nut.

2. The lens barrel according to claim 1, wherein the friction coefficient between the lens frame and the low-friction member and the friction coefficient between the nut and the low-friction member are smaller than the friction coefficient between the lens frame and the nut when the lens frame is in contact with the nut.

3. The lens barrel according to claim 1, wherein the low-friction member is a washer formed into a ring and flat shape, and the feed screw is inserted into the low-friction member through an inner peripheral side thereof.

4. The lens barrel according to claim 3, wherein the low-friction member is formed into a circular ring shape.

5. The lens barrel according to claim 3, wherein an inner periphery of the low-friction member is within an outer shape of the nut when viewed from the optical axial direction.

6. The lens barrel according to claim 1, wherein the low-friction member is within an outer shape of the nut when viewed from the optical axial direction.

7. The lens barrel according to claim 1, wherein a thickness of the low-friction member is equal to or larger than a pitch of the feed screw.

8. The lens barrel according to claim 1, wherein a specific gravity of the low-friction member is larger than at least either one of a specific gravity of the lens frame or a specific gravity of the nut.

9. The lens barrel according to claim 1, wherein the low-friction member is formed of polytetrafluoroethylene.

10. The lens barrel according to claim 2, wherein the low-friction member is a washer formed into a ring and flat shape, and the feed screw is inserted into the low-friction member through an inner peripheral side thereof.

11. The lens barrel according to claim 2, wherein the low-friction member is within an outer shape of the nut when viewed from the optical axial direction.

12. The lens barrel according to claim 2, wherein a thickness of the low-friction member is equal to or larger than a pitch of the feed screw.

13. The lens barrel according to claim 2, wherein a specific gravity of the low-friction member is larger than at least either one of a specific gravity of the lens frame or a specific gravity of the nut.

14. The lens barrel according to claim 2, wherein the low-friction member is formed of polytetrafluoroethylene.

15. The lens barrel according to claim 10, wherein the low-friction member is formed into a circular ring shape.

16. The lens barrel according to claim 10, wherein an inner periphery of the low-friction member is within an outer shape of the nut when viewed from the optical axial direction.

* * * * *